United States Patent Office 3,770,780
Patented Nov. 6, 1973

1

3,770,780
O-(NITROARYL)OXIMES OF 3-KETO STEROIDS
Allen F. Hirsch, Somerville, N.J., assignor to Ortho
Pharmaceutical Corporation
No Drawing. Continuation-in-part of application Ser. No.
882,286, Dec. 4, 1969, now Patent No. 3,686,237. This
application Dec. 2, 1970, Ser. No. 94,530
Int. Cl. C07c 169/20
U.S. Cl. 260—397.3                                    5 Claims

ABSTRACT OF THE DISCLOSURE

O-(nitroaryl)oximes of variously substituted 3-keto steroids in which the aryl ring is in turn substituted in the ortho and/or para position with nitro groups are antilittering, anabolic and androgenic agents.

This is a continuation-in-part of application Ser. No. 882,286, filed Dec. 4, 1969, now U.S. Pat. 3,686,237.

It has been discovered that the O-aryl oximes of variously substituted 3-keto steroids in which the aryl ring is in turn substituted in the ortho and/or para position with nitro groups, are anabolic and androgenic agents. Additionally many of these compounds are potent antilittering agents especially when administered orally post coitally.

The compounds of this invention are defined by the formula:

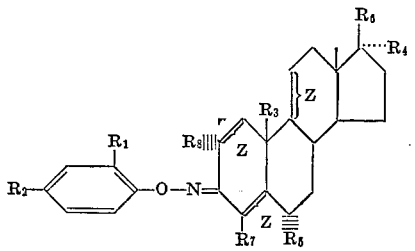

where

Z is a carbon to carbon single bond or a carbon to carbon double bond;
$R_1$ and $R_2$ are H or $NO_2$, and at least one of $R_1$ and $R_2$ is $NO_2$;
$R_3$ is H or $CH_3$;
$R_6$ is hydroxy or the esters thereof, keto, or acetyl;
$R_4$ is H or $CH_3$ or $CH_2$—$CH_3$ or ethinyl;
$R_5$ is H or $CH_3$;
$R_7$ is hydrogen or halogen, and
$R_8$ is H or halogen.

The compounds of this class which are potent antilittering are those where:

$R_1$ and $R_2$ are H or $NO_2$, at least one of $R_1$ and $R_2$ being $NO_2$, and when Z is a carbon to carbon single bond $R_2$ is $NO_2$ and $R_1$ is H;
$R_3$ is H or $CH_3$ and where $R_1$ is H, $R_3$ is $CH_3$;
$R_4$ is H or $CH_3$ or $CH_2$—$CH_3$ and where $R_1$ is H, $R_4$ is also H;
$R_5$ is H or $CH_3$;
$R_6$ is hydroxy or the esters thereof, keto;
$R_7$ is hydrogen or halogen; and
$R_8$ is H or halogen.

2

The precursor ketones of these antilittering agents are generally ineffective as such and the parent oximes substantially less effective or ineffective.

The compounds are prepared from the parent keto steroids with the properly substituted O-arylhydroxylamine in the presence of an acid catalyst, or alternatively by reacting the oxime of the parent keto steroid with a properly substituted aryl halide in the presence of a suitable base, such as sodium hydride. The parent ketones are well known in the art as are the methods of their preparation.

When it is desired to prepare a compound such as 3 - (p-nitrophenoxy)imino-5α-androstane-17-one wherein the A ring is saturated, it is ineffective to react the starting 3,17 dione with the O-aryl hydroxylamine since there may be substitution in both the 3 and 17 positions. In such a case it is necessary to first prepare a compound such as 3-(n-nitrophenoxy) imino-5α-androstan-17β-ol by one of the above procedures and thereafter to oxidize the 17β-ol substituent to the corresponding 17-one, preferably with the use of Jones solution.

Various compounds of this invention are prepared as follows:

3-(2′,4′-DINITROPHENOXY)IMINO COMPOUNDS (I) 3-(2′,4′-dinitrophenoxy)imino-17α-methyl-androst-4-en-17β-ol In the absence of light, 2 drops of concentrated hydrochloric acid was added to a solution of 2.5 g. of methyltestosterone and 1.65 g. of O-(2′,4′-dinitrophenyl) hydroxylamine [prepared as described in J. Het. Chem., 4, 413 (1967)] in 200 ml. of ethanol. The solution was stirred for 4 hours, concentrated and crystallized from ethanol affording 3.0 g. (75%) of 3-(2′,4′-dinitrophenoxy)imino-17α-methyl-androst-4-en-17β-ol; M.P. 180–183; ultraviolet maximum ($CH_2Cl_2$) at 317 (ε 20,300), 245 (ε 2,800); $[\alpha]_D^{24.9}$ +134.4 (ethylene chloride).

*Analysis.*—Calcd. for $C_{26}H_{33}N_3O_6$ (percent): C, 64.58; H, 6.88; N, 8.69. Found (percent): C, 64.72; H, 6.94; N, 8.74.

(II) 3-(2′,4′-dinitrophenoxy)imino-estr-4-en-17β-ol

In the absence of light, 2 drops of concentrated hydrochloric acid was added to a solution of 1.37 g. of 19-nortestosterone and 1.0 g. of O-(2,4-dinitrophenyl) hydroxylamine in 300 ml. of ethanol. The solution was stirred for 4 hours, concentrated and crystallized from ethanol affording 1.67 g. (73.2% of 3-(2′,4′ - dinitrophenoxy) - imino - estr-4-en-17β-ol; M.P. 107–147; ultraviolet maximum $CH_2Cl_2$) at 317 (ε 19,800), 245 (ε 2,000; $[\alpha]_D^{23.6}$ +123.7 (ethylene chloride).

*Analysis.*—Calcd. for $C_{24}H_{29}N_3O_6$ (percent): C, 63.28; H, 6.42; N, 9.22. Found (percent): C, 63.12; H, 6.43; N, 9.18.

(III–A) 3-(2′,4′-dinitrophenoxy)imino-androsta-1,4-dien-17β-ol)

In the absence of light 1.40 g. of 1-dehydrotestosterone and 1.0 g. of O-(2′,4′-dinitrophenyl) hydroxylamine was dissolved in 350 ml. ethanol and a few drops of concentrated hydrochloric acid added to the solution. The entire mixture was stirred at room temperature for two hours. The solution was evaporated to dryness and the resulting light yellow residue crystallized from ethanol; M.P. 106°–

112° C., 154°–157° C., ultraviolet (CH$_2$Cl$_2$) at 325 ($\epsilon$ 22,300), 240 ($\epsilon$ 18,000).

*Analysis.*—Calcd. for C$_{25}$H$_{29}$N$_3$O$_6$ (percent): C, 64.23; H, 6.25; N, 8.99. Found (percent): C, 64.00; H, 6.33; N, 8.93.

(III–B) 3-(2',4'-dinitrophenoxy)imino-androst-4-en-17β-ol

Starting with testosterone and following the procedure of Example I, 3-(2',4'-dinitrophenoxy)imino-4-androsten-17β-ol is prepared as a light yellow solid having a M.P. of 170.5–174.0°. Ultraviolet maximum (CH$_2$Cl$_2$) 315 ($\epsilon$ 19,700); 245 (21.800); [α]$_D^{23.6}$ +155.0° (ethylene chloride).

*Analysis.*—Calcd. for C$_{25}$H$_{31}$N$_3$O$_6$ (percent): C, 63.95; H, 6.65; N, 8.95. Found (percent): C, 63.95; H, 6.75; N, 8.79.

(IV) 17β-enanthyloxy-3-(2',4'-dinitrophenoxy) imino-androst-4-ene

In the absence of light, a drop of concentrated hydrochloric acid was added to a solution of 3.00 g. of androst-4-en-17β-ol-3-one-17-enanthate and 1.5 g. of O-(2,4-dinitrophenyl) hydroxylamine in 500 ml. ethanol. The solution was stirred for 3 hours, concentrated, and crystallized from ethanol affording 3.75 g. (86%) of 17β-enanthyloxy-3-(2',4' - dinitrophenoxy)imino-androst-4-ene; M.P. 118–123° C.; ultraviolet (CH$_2$Cl$_2$) at 318 mμ ($\epsilon$ 10,500) and 245 mμ ($\epsilon$ 23,100); [α]$_D^{20.6°\,C.}$ 153° (ethylene chloride).

*Analysis.*—Calcd. for C$_{32}$H$_{43}$N$_3$O$_7$ (percent): C, 66.07; H, 7.45; N, 7.22. Found (percent): C, 66.29; H, 7.52; N, 7.24.

(V) 3-(2',4'-dinitrophenoxy)imino-6α-methyl-17α-acetoxy-pregn-4-en-20-one

In the absence of light, 1–2 drops of concentrated hydrochloric acid was added to a solution of 1.86 g. of 6α - methyl - 17α - acetoxy-pregn-4-ene-3,20-dione and 1.00 g. of O-(2,4-dinitrophenyl) hydroxylamine in 300 ml. of ethanol. After stirring at room temperature for 18 hours, the solution was concentrated under vacuum. The residue was crystallized from ethanol yielding 1.81 g. (63%) of 3-(2',4'-dinitrophenoxy)imino-17α-acetoxy-6α-methyl-pregn-4-en-20-one which was subsequently refluxed for 2.5 hours with freshly distilled hexane to remove any ethanol of crystallization. Evaporation of the hexane yielded the compound; M.P. 129–133°; ultraviolet maximum (CH$_2$Cl$_2$) at 315 ($\epsilon$ 18,900), 245 ($\epsilon$ 21,700); [α]$_D^{24.6}$ +113.0° (ethylene chloride).

*Analysis.*—Calcd. for C$_{30}$H$_{37}$N$_3$O$_8$ (percent): C, 63.48; H, 6.57; N, 7.40. Found (percent): C, 63.38; H, 6.85; N, 7.22.

(VI) 3-(2',4'-dinitrophenoxy)imino-19-nor-pregn-4-en-17α-ol

In the absence of light, 1.48 g. of 17-ethyl-19-nortestosterone and 1.0 g. of O-(2,4-dinitrophenyl) hydroxylamine were dissolved in 350 ml. ethanol; and a few drops of concentrated HCl were added to the solution. The total solution was then stirred at room temperature for 1½ hours; and then evaporated to dryness. The resulting pale, yellow residue was crystallized from ethanol yielding 0.63 g. (26%) of 3-(2',4'-dinitrophenoxy)imino-19-nor-pregn-4-en-17β-ol; M.P. 168–176° C. decomposition; ultraviolet maximum (CH$_2$Cl$_2$) at 316 ($\epsilon$ 19,800), 245 ($\epsilon$ 22,100).

*Analysis.*—Calcd. for C$_{26}$H$_{33}$N$_3$O$_6$ (percent): C, 64.58; H, 6.88; N, 8.69. Found (percent): C, 64.50; H, 6.87; N, 8.57.

(VI) 3-(2',4'-dinitrophenoxy)imino-19-nor-17α-pregn-4-en-20-yn-17-ol

In the absence of light, a mixture of 1.49 g. (0.005 mole) of norethindrone, 1 g. of O-(2,4-dinitrophenyl) hydroxylamine (0.005 mole) and 500 ml. of ethyl alcohol was heated to affect solution. To the warm solution was added 5 drops of concentrated hydrochloric acid. The solution was stirred for 1 hour after which time an additional 50 mg. of O-(2,4-dinitrophenyl) hydroxylamine was added. The solution was concentrated under reduced pressure and the residue crystallized from ethanol affording 1.61 g. of yellow crystals which melted at 179–184° C.; ultraviolet maximum (CH$_2$Cl$_2$) at 427 ($\epsilon$ 20,500), 408 ($\epsilon$ 19,500).

*Analysis.*—Calcd. for C$_{26}$H$_{29}$N$_3$O$_6$ (percent): C, 65.12; H, 6.10; N, 8.76. Found (percent): C, 65.29; H, 6.25; N, 8.87.

(VIII) 3-(2',4'-dinitrophenoxy)imino-5α-androstan-17β-ol 0.96 gram of sodium hydride was added to a solution of 6.30 grams of dihydrotestosterone oxime in 50 ml. of tetrahydrofuran. After refluxing for one hour, 50 ml. of dimethyl sulfoxide and 14 grams of 2,4-dinitrofluorobenzene were added. The solution was refluxed for three minutes, poured into water and filtered. Upon chromatography on a column eluted with a mixture of 90 parts chloroform and 10 parts acetone, and subsequent crystallization from ethanol there was obtained 3.70 g. of product, M.P. 108–111° C. ultraviolet (CH$_2$Cl$_2$) at 307 ($\epsilon$ 15,900).

*Analysis.*—Calcd. for C$_{25}$H$_{35}$N$_5$O$_6$ (percent): C, 63.68; H, 7.05; N, 8.91. Found (percent): C, 63.68; H, 7.12; N, 8.98.

(IX) 17β-acetoxy-3-(2',4'-dinitrophenoxy)imino-5α-androstane

In the absence of light, a drop of concentrated hydrochloric acid was added to a solution of 2.98 g. of dihydrotestosterone-acetate and 1.8 g. of O-(2,4-dinitrophenyl) hydroxylamine in 200 ml. methanol. The solution was refluxed, with stirring, for one hour, concentrated, washed with water, and crystallized from ethanol affording 3.25 g. (71%) of 17β-acetoxy-3-(2',4'-dinitrophenoxy)imino-5α-androstane; M.P. 175–177° C.; ultraviolet (CH$_2$Cl$_2$) at 307 ($\epsilon$ 16,800); [α]$_D^{26.7°}$ +29.6° (ethylene chloride).

*Analysis.*—Calcd. for C$_{27}$H$_{35}$N$_3$O$_7$ (percent): C, 63.14; H, 6.87; N, 8.18. Found (percent): C, 63.22; H, 6.85; N, 8.14.

(X) 17α-methyl-3-(2',4'-dinitrophenoxy)imino-androsta-4,9(11)-dien-17β-ol

In the absence of light, a drop of concentrated hydrochloric acid was added to a solution of 2.15 g. of androsta-4,9(11)-dien-17β-ol-3-one and 1.5 g. of O-(2,4-dinitrophenyl) hydroxylamine in 500 ml. ethanol. The solution was stirred for 3 hours, concentrated, and crystallized from ethanol affording 2.05 g. (60%) of 17α-methyl - 3 - (2',4' - dinitrophenoxy)imino - androsta-4,9(11)-dien - 17β - ol; M.P. 168–172° C.; ultraviolet (CH$_2$Cl$_2$) at 318 mμ ($\epsilon$ 20,800) and 247 mμ ($\epsilon$ 22,900); [α]$_D^{24.7°\,C.}$ +122 (ethylene chloride).

*Analysis.*—Calcd. for C$_{26}$H$_{32}$N$_3$O$_6$ (percent): C, 64.71; H, 6.68; N, 8.70. Found (percent): C, 64.74; H, 6.56; N, 8.71.

3-(p-NITROPHENOXY)IMINO COMPOUNDS (XI) 3-(p-nitrophenoxy)imino-androsten-4-en-17β-ol To a solution of 1.33 g. of tert-butyl N-hydroxy carbamate and 0.66 g. of potassium hydroxide (85%) dissolved in 20 ml. of ethanol was added dropwise a solution of 1.41 g. of p-fluoronitrobenzene in 20 ml. of ethanol. The solution was stirred for 18 hours, poured onto ice water and the resulting solid filtered and washed well with water. Crystallization from benzene-hexane afforded 2.15 g. (84.5%) of tert-butyl N-(p-nitrophenoxy)carbamate as white crystals, M.P. 106–108°.

*Analysis.*—Calcd. for $C_{11}H_{14}N_2O_5$ (percent): C, 51.97; H, 5.55; N, 11.02. Found (percent): C, 51.80; H, 5.62; N, 11.18.

A solution of 12 g. of tert-butyl N-(p-nitrophenoxy) carbamate in 45 ml. of trifluoroacetic acid was stirred for 15 minutes, poured onto 300 ml. of ice water, filtered and the solid dried. The mother liquor was neutralized with potassium carbonate affording additional product. The total yield of combined product was 5.49 g. (75.5%) which was subsequently crystallized from ethanol yielding pure O-(p-nitrophenyl) hydroxylamine; M.P. 126.5–128°; ultraviolet maximum ($CH_2Cl_2$) at 308 ($\epsilon$ 11,400).

*Analysis.*—Calcd. for $C_6H_6N_2O_3$ (percent): C, 46.76; H, 3.92; N, 18.18. Found (percent) C, 46.94; H, 3.87; N, 18.00.

In the absence of light, 2 drops of concentrated hydrochloric acid was added to a solution of 1.39 g. of testosterone and 0.75 g. of O(p-nitrophenyl)hydroxylamine in 175 ml. of ethanol. The solution was stirred for 3 hours, concentrated and crystallized from ethanol affording 1.52 g. (74%) of 3-(p-nitrophenoxy) imino-androst-4-en-17β-ol; M.P. 133.5–188; ultraviolet maximum ($CH_2Cl_2$) at 328 ($\epsilon$ 18,300), 260 ($\epsilon$ 13,200) $[\alpha]_D^{23.9}$ +165.3° (ethylene chloride).

*Analysis.*—Calcd. for $C_{25}H_{32}N_2O_4$ (percent): C, 70.73; H, 7.60; N, 6.60. Found (percent): C, 70.81; H, 7.41; N, 6.44.

(XII) 3-(p-nitrophenoxy)imino-17α-methyl-androst-4-en-17β-ol

In the absence of light, 2 drops of concentrated hydrochloric acid was added to a solution of 1.51 g. of methyltestosterone and 0.77 mg. of O-(p-nitrophenyl) hydroxylamine in 175 ml. of ethanol. After stirring for 2½ hours, the solution was concentrated and crystallized from ethanol affording 1.46 g. (67%) of 3-(p-nitrophenoxy)imino - 17α - methylandrost-4-en-17β-ol; M.P. 180–184; ultraviolet maximum ($CH_2Cl_2$) at 326 ($\epsilon$ 17,600), 360 ($\epsilon$ 12,900); $[\alpha]_D^{24}$ +150.1 (ethylene

*Analysis.*—Calcd. for $C_{26}H_{34}N_2O_4$ (percent): C, 71.21; H, 7.81; N, 6.39. Found (percent): C, 71.36; H, 7.94; N, 6.48.

(XIII) 3-(p-nitrophenoxy)imino-estr-4-en-17β-ol

In the absence of light 2 drops of concentrated hydrochloric acid was added to a solution of 2.09 g. of 19-nortestosterone and 0.93 g. of O-(p-nitrophenyl) hydroxylamine in 200 ml. of ethanol. After stirring for 24 hours the solution was concentrated and crystallized from ethanol affording 1.29 g. (41.5%) of 3-(p-nitrophenoxy) imino-estr-4-en-17β-ol; M.P. 174–184; ultraviolet maximum ($CH_2Cl_2$) at 257 ($\epsilon$ 14,200), 327 ($\epsilon$ 20,100); $[\alpha]_D^{31.1}$ +137.0 (ethylene chloride).

*Analysis.*—Calcd. for $C_{24}H_{30}N_2O_4$ (percent): C, 70.22; H, 7.37; N, 6.82. Found: C, 70.27; H, 7.45; N, 6.89.

(XIV) 17β-acetoxy-3-(p-nitrophenoxy)imino-5α-androstane

To a solution of 2.16 g. of 5α-dihydrotestosterone acetate and 1.0 g. of O-(p-nitrophenyl) hydroxylamine in 200 ml. of ethanol was added 2 drops of concentrated hydrochloric acid. The solution was stirred for 3 hours, concentrated and crystallized from ethanol affording 1.954 g. (64%) of 17β - acetoxy - 3-(p-nitrophenoxy)imino-5α-androstane; M.P. 173–175; ultraviolet maximum ($CH_2Cl_2$) at 320 ($\epsilon$ 15,900); $[\alpha]_D^{23.2}$ +27.7 (ethylene chloride).

*Analysis.*—Calcd. for $C_{27}H_{36}N_2O_5$ (percent): C, 69.21; H, 7.74; N, 5.98. Found (percent): C, 69.13; H, 7.69; N, 5.94.

(XV) 3-(p-nitrophenoxy)imino-5α-androstan-17β-ol

To a solution of 3.05 g. of dihydrotestosterone oxime in 50 ml. of tetrahydrofuran was added 0.48 g. of sodium hydride (62.4%). After refluxing for one hour, 50 ml. of dimethyl sulfoxide and 1.41 g. of p-fluoronitrobenzene were added. The solution was refluxed 5 minutes and poured into water. The precipitate was filtered and crystallized from ethanol affording 1.60 g. (38%) of 3-(p-nitrophenoxy)imino-5α-androstan-17β-ol; M.P. 170–173° C.; ultraviolet ($CH_2Cl_2$) at 319 m$\mu$ ($\epsilon$ 16,200); $[\alpha]_D^{75°\ C.}$ +6° (ethylene chloride).

*Analysis.*—Calcd. for $C_{25}H_{34}N_2O_4$ (percent): C, 70.40; H, 8.03; N, 6.57. Found (percent): C, 70.36; H, 8.11; N, 6.54.

(XVI) 3-(p-nitrophenoxy)imino-androst-4-en-17-one

In the absence of light, 2 drops of concentrated hydrochloric acid was added to a solution of 1.86 g. of androstenedione and 1.0 g. of O-(p-nitrophenyl) hydroxylamine in 200 ml. of ethanol. The solution was stirred for 6.5 hours, concentrated and crystallized from ethanol affording 1.14 g. (41.5%) of 3-(p-nitrophenoxy)imino-androst-4-en-17-one; M.P. 193–198; ultraviolet maximum ($CH_2Cl_2$) at 327 ($\epsilon$ 20,700), 257 ($\epsilon$ 14,300), 232 ($\epsilon$ 17,200); $[\alpha]_D^{22.4}$ +219.3 (ethylene chloride).

*Analysis.*—Calcd. for $C_{25}H_{30}N_2O_4$ (percent): C, 71.07; H, 8.16; N, 6.63. Found (percent): C, 71.04; H, 7.06; N, 6.56.

(XVII) 3-(p-nitrophenoxy)-4-chloro-17-acetoxy-androst-4-ene

In the absence of light, 2 drops of concentrated hydrochloric acid was added to a solution of 2.37 g. of 4-chlorotestosterone acetate and 1.0 g. of O-(p-nitrophenyl) hydroxylamine in 800 ml. of ethanol. The solution was stirred for 2 days, concentrated and crystallized from methylene chloride: ethanol affording 1.44 g. (44.3%) of 3-(p-nitrophenoxy)imino-4-chloro-17-acetoxy-androst-4-ene; M.P. 219–219.5; ultraviolet maximum ($CH_2Cl_2$) at 320 ($\epsilon$ 22,400), 260 ($\epsilon$ 14,000), 234 ($\epsilon$ 11,900); $[\alpha]_D^{24.1}$ +120.8 (ethylene chloride).

*Analysis.*—Calcd. for $C_{27}H_{33}N_2O_5Cl$ (percent): C, 64.72; H, 6.63; N, 5.59; Cl, 7.07. Found (percent): C, 64.84; H, 6.66; N, 5.61; Cl, 7.02.

(XVIII) 3-(p-nitrophenoxy)imino-17α-pregn-4-en-20 yn-17β-ol

In the absence of light, 2 drops of concentrated hydrochloric acid was added to a solution of 2.03 g. of ethisterone and 1.0 g. of O-(p-nitrophenyl) hydroxylamine in 900 ml. of ethanol. The solution was stirred for 24 hours, concentrated and crystallized from ethanol affording 1.99 g. (68.2%) of 3-(p-nitrophenoxy)imino-17α-pregn-4-en-20-yn-17β-ol; M.P. 111–159; ultraviolet maximum ($CH_2Cl_2$) at 327 ($\epsilon$ 20,400), 258 ($\epsilon$ 13,300), 232 ($\epsilon$ 17,500); $[\alpha]_D^{26.3}$ +127.7 (ethylene chloride).

*Analysis.*—Calcd. for $C_{27}H_{32}N_2O_4$ (percent): C, 72.30; H, 7.19; N, 6.25. Found (percent): C, 72.11; H, 7.12; N, 6.15.

Using conventional esterification methods, the following esters of the product of Example XV were prepared:

(XIX) 17β-propionoxy-3-(p-nitrophenoxy)imino-5α-androstane (XX) 17β-enanthyloxy-3-(p-nitrophenoxy)imino-5α-androstane (XXI) 17β-butyroxy-3-(p-nitrophenoxy)imino-5α-androstane (XXII) 17β-acetoxy-2α-bromo-3-(p-nitrophenoxy) imino-5α-androstane.

To a solution of 1 g. of 17β-acetoxy-2α-broma-5α-androstane-3-one in ethanol was added .370 g. of O-(p-nitrophenyl)hydroxylamine and a drop of concentrated hydrochloric acid. It was stirred for two hours and the solvent taken off. Crystallization from ethanol afforded 1.14 g. (84%) of white crystals; M.P. 180–183° C.; ultraviolet ($CH_2Cl_2$) at 313 ($\epsilon$ 16,200).

*Analysis.*—Calcd. for $C_{27}H_{35}N_2O_5Br$ (percent): C, 59.23; H, 6.44; N, 5.17; Br, 14.59. Found (percent) C, 59.40; H, 6.30; N, 5.08; Br, 14.57.

(XXIII) 3-(p-nitrophenoxy)imino-5α-androstane-17-one

To a solution of 5 g. of 3-(p-nitrophenoxy)amino-5α-androstane-17β-ol and 150 ml. of acetone kept in an ice bath was added dropwise 4.5 ml. of Jones solution. This was stirred for three hours and poured into wice water. It was filtered and washed with $H_2O$. Crystallization from a benzene/hexane solution afforded 4.3 g. (88%) of (3-(p-nitrophenoxy)imino-5α-androstane-17-one; M.P. 170–172°, ultraviolet ($CH_2Cl_2$) at 318 m$\mu$ ($em$=15,900).

*Analysis.*—Calcd. for $C_{25}H_{32}O_4N_2$ (percent): C, 70.73; H, 7.60; N, 6.60. Found (percent): C, 70.36; H, 7.71; N, 6.47.

As noted previously many compounds of this invention are potent antilittering agents. Antilittering activity is measured as follows:

A test group of rats is fed a calculated amount of a test substance in the feed for a period of 7 days during which time males and females are kept separate with both sexes receiving the test substance. Thereafter, the males and females are cohabited and the diet fed is continued for 15 days. At the end of this time the cohabitation is ended and the drug removed from the diet, the females are then observed for a period of 21 days and are allowed to deliver their young, if any, and to raise them. A control group of rats is handled in precisely the same way at the same time except that their diet does not include the test substance.

The following table illustrates the percentage of rats which give birth at the dosage level indicated.

| Compound of Example— | Dosage level, mg./kg. Theory | Dosage level, mg./kg. Actual | Percent of animals giving birth |
|---|---|---|---|
| I | 10 | 8.8 | 0 |
| II | 10 | 8.3 | 0 |
| IIIB | 20 | 15.2 | 0 |
| IV | 20 | 17.4 | 0 |
| V | 20 | 18.9 | 0 |
| XIV | 40 | 13.2 | 12.5 |

These compounds also exhibit post coital antilittering properties wehn administered on days 9–12 after coitus to the rat. The following table illustrates the percentage of properties when administered on days 9–12 after coitus to resorptions obtained at the indicated dosage levels. The activity of the parent ketone and unsubstituted oxime is also noted.

| Compound of Example— | Dosage level, mg./kg. | Percent resorptions Compound | Percent resorptions Parent ketone | Oximes |
|---|---|---|---|---|
| II | 20 | 100 | | 39.5 |
| | 40 | | 20.6 | |
| IIIA | 40 | 100 | | |
| IIIB | 10 | 80 | | |
| | 40 | | 8.2 | 91.2 |
| XI | 40 | 100 | | |
| XIV | 2.5 | 96.6 | | |
| | 20 | | | 2.5 |
| | 40 | | 5.0 | |
| XV | 2.5 | 100 | | |
| | 20 | 100 | | |
| | 40 | | 6.9 | 1.6 |
| XIX | 5.0 | 100 | | |
| XX | 5.0 | 100 | | |
| XXI | 40.0 | 100 | | |
| XXII | 2.5 | 100 | | |
| | 5.0 | | 0.0 | |
| XXIII | 5.0 | 100 | 0.0 | |

While all of the compounds are at least weak anabolic agents, a number of the compounds are unusually potent anabolic agents. The compound of Example II has a ventral prostate potency of 0.15 as compared to methyltestosterone and a levator ani potency of 2.1 when compared to methyltestosterone. Thus the anabolic:androgenic ratio is very favorable. This is also true of the compound of Example VI which has an anabolic:androgenic ratio of 12.5 with a ventral prostate potency of 0.18 and a levator ani potency of 2.24 when compared to methyl testosterone, and the compound of Example X which has a ventral prostate potency of 1.9 and a levator ani potency of 4.6.

What is claimed is:

1. 3-(p-nitrophenoxy) imino-5α-androstane-17-one.
2. 17β - acetoxy-2α-bromo-3-(p-nitrophenoxy) imino-5α-androstane.
3. 17β-propionoxy-3-(p-nitrophenoxy) imino-5α-androstane.
4. 17β - enanthyloxy-3-(p-nitrophenoxy) imino-5α-androstane.
5. 17β - butyroxy-3-(p-nitrophenoxy) imino-5α-androstane.

References Cited
UNITED STATES PATENTS
3,415,818   12/1968   Christiansen _____ 260—239.55

ELBERT L. ROBERTS, Primary Examiner

U.S. Cl. X.R.

260—397.4, 397.5; 424—238

PC-1050
(5/69)

UNITED STATES PATENT OFFICE
CERTIFICATE OF CORRECTION

Patent No. 3,770,780      Dated November 6, 1973

Inventor(s) Hirsch, Allen F.

It is certified that error appears in the above-identified patent and that said Letters Patent are hereby corrected as shown below:

In Column 2, line 18, ("n-nitrophenoxy") should be "( p-nitrophenoxy )".

In Column 2, line 52, "(e 2,000;" should be "(e 2,000);".

In Column 2, line 57, "androsta" should be "andrasta".

In Column 2, line 58, "1,4-dien-17 -01)" should be "1,4-dien-17 -01".

In Column 3, line 29, "153°" should be "+ 153°".

In Column 3, line 70, "(VI)" should be "(VII)".

In Column 5, line 39, "ethylene" should be "ethylene chloride".

In Column 7, line 2, "amino" should be "imino".

In Column 7, line 5, "wice" should be "ice".

In Column 7, line 43, "wehn" should be "when".

In Column 7, line 45 should be deleted. Repeated twice in patent.

Signed and sealed this 16th day of July 1974.

(SEAL)
Attest:

McCOY M. GIBSON, JR.
Attesting Officer

C. MARSHALL DANN
Commissioner of Patents